(12) United States Patent
Clymans

(10) Patent No.: US 8,906,312 B2
(45) Date of Patent: Dec. 9, 2014

(54) POLYETHYLENE MANUFACTURING SYSTEM AND METHOD

(75) Inventor: Paul Jan Clymans, Kapelle-Op-Den-Bos (BE)

(73) Assignee: ExxonMobil Chemical Patents Inc., Houston, TX (US)

(*) Notice: Subject to any disclaimer, the term of this patent is extended or adjusted under 35 U.S.C. 154(b) by 308 days.

(21) Appl. No.: 13/577,451

(22) PCT Filed: Mar. 12, 2010

(86) PCT No.: PCT/US2010/027194
§ 371 (c)(1),
(2), (4) Date: Oct. 11, 2012

(87) PCT Pub. No.: WO2011/112199
PCT Pub. Date: Sep. 15, 2011

(65) Prior Publication Data
US 2013/0171029 A1   Jul. 4, 2013

(51) Int. Cl.
*B01J 19/24* (2006.01)
*B01J 4/00* (2006.01)
*B01J 19/00* (2006.01)
*C08F 10/02* (2006.01)

(52) U.S. Cl.
CPC *B01J 19/24* (2013.01); *B01J 4/008* (2013.01); *B01J 19/0006* (2013.01); *C08F 10/02* (2013.01); *B01J 2219/00162* (2013.01); *C08F 2400/02* (2013.01)
USPC ............ 422/131; 422/138; 422/112; 526/65; 526/68

(58) Field of Classification Search
CPC .................................. C08F 10/02; C08F 2/01
USPC ................................................... 422/131, 138
See application file for complete search history.

(56) References Cited

FOREIGN PATENT DOCUMENTS

| WO | WO 2007/051561 | 5/2007 |
|----|----------------|--------|
| WO | WO 2007/134670 | 11/2007 |
| WO | WO 2007/134671 | 11/2007 |

*Primary Examiner* — Lessanework Seifu
(74) *Attorney, Agent, or Firm* — Leandro Arechederra, III

(57) ABSTRACT

An ethylene polymerization system is provided with a quench system and that cools the product mixture entering the separation system with a reduced load on the first compressor of the system. The system includes first and second compressors, a high pressure reactor; a high pressure let down valve through which the product mixture from the high pressure reactor flows, and a separation system that separates gas from the product mixture. The quench system includes a pump having a suction inlet that receives all or substantially all of the low pressure flow of monomer from the first compressor. The system provides quenching of the product stream while allowing the first compressor to be operated at a discharge pressure lower than the suction pressure of the second compressor, thereby conserving energy.

20 Claims, 3 Drawing Sheets

POLYETHYLENE MANUFACTURING SYSTEM AND METHOD

PRIORITY CLAIM

This application is a National Stage Application of International Application No. PCT/US2010/027194 filed Mar. 12, 2010, which is hereby incorporated by reference in its entirety.

FIELD OF THE INVENTION

This invention generally relates to a polyethylene manufacturing system for polymerizing ethylene, and is specifically concerned with a quench system and method for such a system that reduces the load on the first compressor during operation.

BACKGROUND OF THE INVENTION

High pressure polyethylene reactors are widely used for the polymerization of ethylene, and include autoclave reactors which operate between 1220 to 2000 bar (122 to 200 MPa) and tubular reactors which operate between 2500 and 3100 bar (250 to 310 MPa), both types of reactors, fresh ethylene from an ethylene supply is compressed to reactor pressure by the combination of a first compressor which pressurizes the ethylene to an intermediate pressure on the order of 300 bar (30 MPa), and a second compressor which pressurizes the fresh ethylene together with recycled ethylene from the 300 bar (30 MN) intermediate pressure up to the final reactor pressure. Both types of reactors create a product mixture comprising principally polymer and unreacted monomer. The mixture leaves the reactor through a high pressure let down valve, and then enters a separation system in which unreacted monomer is separated from the polymer and recycled back to the suction of the second compressor. Hence the monomer supplied to the reactor by the second compressor is a combination of feed or "make-up" monomer supplied by the first compressor and recycled monomer from the separation system.

The polymerization of ethylene is an exothermic process which generates heat. Consequently, there is a need to further cool the product mixture after it has left the reactor. In the prior art, particularly in the case of tubular reactors, such cooling has been accomplished by injecting cold ethylene into it as a "quench" prior to the entry of the product mixture into the separation system. The injection of cold ethylene cools the product mixture as it enters the separation system, thereby promoting the phase separation of the product stream into a polymer-rich liquid phase, and a monomer rich off gas. In particular, the attendant dilution of the product stream with an ethylene rich stream promotes the phase separation of ethylene vinyl acetate (EVA) in the separation system by lowering its concentration in the product stream.

Before the cold ethylene can be injected into the flow of product mixture from the reactor, it first must be compressed to a pressure which will allow such injection. In the past, the required flow of cold, compressed ethylene has been diverted out of the flow of make-up ethylene that the first compressor supplies to the second compressor. However, such a flow scheme requires the first compressor to provide the necessary compression to inject the cold ethylene into the flow of product mixture from the reactor.

SUMMARY OF THE INVENTION

In conventional systems, in order for the first compressor to effectively supply make-up ethylene to the second compressor in prior art polyethylene manufacturing systems, it is necessary that the discharge pressure of the first compressor be set to a level that is at least equal to the suction pressure of the second compressor. This requirement alone places a considerable demand upon the first compressor. When such a system includes a cold quenching system wherein make-up ethylene from the first compressor is diverted from the second compressor to quench the product mixture, it is necessary for the discharge pressure of the first compressor to be set at a level considerably higher than the suction pressure of the second compressor. Such a flow scheme substantially raises the power consumption of the first compressor. Accordingly, there is a need for a quenching system and method for an ethylene polymerization system that effectively cools the product mixture entering the separation system of the system without increasing the load on the first compressor. Ideally, such a quenching technique would obviate the need for the discharge pressure of the first compressor to equal the suction pressure of the second compressor, thereby further reducing the load and hence the power requirements of the first compressor, as well as the wear and maintenance requirements that such high loads ultimately result in.

To these ends, the invention is a system for the polymerization of ethylene having a quench system and method that cools the product mixture entering the separation system with a reduced load on the first compressor of the system. The system comprises a first compressor that provides a monomer under relatively low pressure and a second compressor located downstream of, and in fluid communication with, the first compressor. The second compressor pressurizes the monomer to a relatively high pressure. A reactor is located downstream of, and in fluid communication with, the second compressor. The reactor polymerizes the monomer under relatively high pressure to produce a product mixture. A separation system is located downstream of, and in fluid communication with, the reactor. A quench system includes a pump (e.g., a jet pump) located downstream of, and in fluid communication with the reactor to cool the product mixture entering the separation system. The pump has a suction inlet that receives at least a portion of the monomer under relatively low pressure from the first compressor such that the pressure of the monomer under relatively low pressure from the first compressor is less than a suction pressure of the second compressor.

The use of a jet pump in the quench system advantageously reduces the load on the first compressor by increasing the pressure of the make-up monomer discharged by the first compressor by means of energy supplied by the product mixture discharged by the second compressor. There is therefore no external energy cost, in contrast to the conventional technique of increasing the load on the first compressor.

The method of the invention generally comprises the steps of providing a jet pump in a system for the polymerization of ethylene as previously described between the flow of product mixture from the let down valve and the separation system, and directing substantially all of the monomer under relatively low pressure from the first compressor to a suction inlet of the jet pump. The method preferably further includes the step of operating the first compressor such that a discharge pressure of the first compressor is less than a suction pressure of the second compressor in order to conserve energy. Finally, the method may further include the step of monitoring a suction pressure of the second compressor, and modulating the monomer under relatively low pressure from the first compressor on the basis of the second compressor suction pressure. Such modulation may be implemented by controlling the spillback valves of the first compressor, modulating the speed of the first compressor, or modulating the discharge pressure of the first compressor.

DETAILED DESCRIPTION OF THE INVENTION

Figure 1:
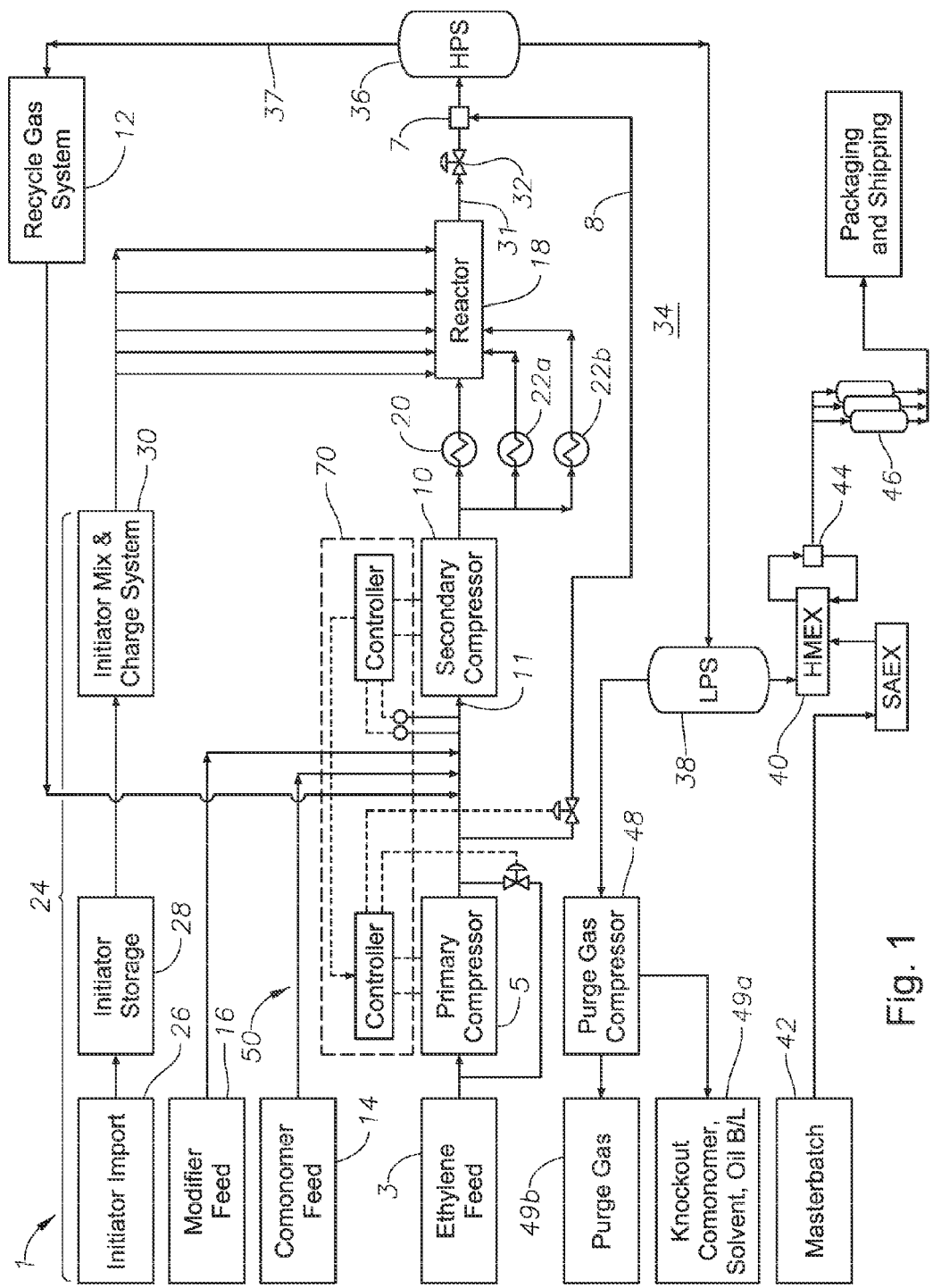
FIG. 1 is a schematic diagram of a system according to the invention comprising a tubular reactor.

FIG. 1 schematically illustrates a polymerization system 1 that incorporates the quench system of the present invention. The system 1 includes a monomer feed source 3 which supplies monomer at a pressure of 70 bar (7 MPa) to a first compressor 5 which in turn pressurizes the monomer to relatively low pressure. Preferably, a "relatively low pressure" can typically mean a pressure of about 150-200 bar (15-20 MPa), or about 200-300 bar (20-30 MN), or about 300-350 bar (30-35 MN). Under normal operating conditions, all or substantially all of the monomer discharged from the outlet of the first compressor 5 is directed to a jet pump 7 via a conduit 8. The system 1 further includes a second compressor 10 located downstream of and in fluid communication with, the first compressor 5. Second compressor 10 provides a monomer under relatively high pressure. Preferably, a "relatively high pressure" can typically mean a pressure of greater than or equal to about 1500 bar (150 MPa), or greater than or equal to about 2000 bar (200 MPa), or greater than or equal to about 2500 bar (250 MPa).

The terms "downstream" and "upstream" as used herein are used with reference to the direction of the flow of monomer and polymer through the system beginning with the monomer source and going through to the finished polymer storage facilities, unless another meaning is clear from the context.

The term "monomer" as used herein refers to ethylene and to any mixture of ethylene with one or more comonomers. Comonomers suitable for copolymerization with ethylene under high pressure include vinyl ethers, such as vinyl methyl ether and vinyl phenyl ether, olefins such as propylene, 1-butene, 1-octene and styrene, vinyl esters such as vinyl acetate, vinyl butyrate and vinyl pivalate, haloolefins such as vinyl fluoride and vinylidene fluoride, acrylic esters such as methyl acrylate, ethyl acrylate and methacrylates, other acrylic or methacrylic compounds such as acrylic acid, methacrylic acid, maleic acid, acrylonitrile and the acrylamides, and other compounds such as allyl alcohol, vinyl silanes, and other copolymerisabie vinyl compounds.

Second compressor 10 has a suction inlet 11 that communicates with a conduit connected to a recycle gas system 12. Both the first and second compressors 5, 10 are reciprocating, positive displacement compressors whose outputs may be modulated via rod loading controls (not shown) of a type known in the prior art. The second compressor 10 is a two-stage reciprocating compressor that pressurizes ethylene received from the recycle gas system to a pressure of about 3000 bar (300 MPa). As indicated in FIG. 1, other reaction components may also be injected into the suction inlet 11 of the second compressor 10 along with the ethylene, including vinyl acetate comonomer from comonomer feed 14 to make copolymer, such as EVA, and modifiers (also know as chain transfer agents) such as propylene, 1-butene, carbon tetrachloride, and proprionaldehyde from modifier feed 16 which help to control the melt index of the polymer in the reactor 18. The compressed ethylene and modifier flow leaving the second compressor 10 is split into two streams, one of which flows through a heater 20 before entering the inlet end of the tubular reactor 18 and the other being split into one or more side streams which flow through coolers 22a, 22b before entering the tubular reactor 18 at points along its length. The tubular reactor 18 is also provided along its length with several initiator injection points which are fed from an initiator injection system 24. The initiator system 24 includes an initiator source 26, an initiator storage vessel 28, and an initiator mix and charge system 30. Organic peroxides are a preferred class of initiators. Typically, a mixture of several initiators having different decomposition temperatures will be used in order to provide ongoing generation of free radicals as the temperature of the reaction mixture rises.

From the tubular reactor 18 the mixture of polymer alone or in combination with unreacted monomer (also referred to as "the product stream") passes through a conduit 31 having a high pressure let down valve 32. The position of the high pressure let down valve 32 is controlled to maintain a pressure of 3000 bar (300 MPa) in the tubular reactor 18. From the high pressure let down valve 32, the product stream continues its flow through conduit 31 into jet pump 7 (described below and shown in more detail in FIG. 3) and then into the separation system 34. System 34 includes a high pressure separation vessel 36 that is serially connected to a low pressure separation vessel 38. As depicted in FIG. 1, high pressure separation vessel 36 has a central, generally cylindrical portion, an outlet conduit 37 at its upper end for venting ethylene off gas from the product stream, and a lower dish-shaped portion for collecting liquids separated from the product stream. The product mixture from the jet pump 7 enters the high pressure separation vessel 36 through an inlet set into the cylindrical wall of the upper part of the vessel and, once inside, rapidly separates into a stream of unreacted monomer gas and a polymer rich liquid phase. The separated monomer gas leaves the high pressure separation vessel 36 as off gas via outlet conduit 37, which in turn directs it to the recycle gas system 12. The gas recycle system 12 includes a waste heat boiler, coolers for cooling the monomer gas, and knock-out pots for dewaxing. The cooled and dewaxed monomer gas leaves the recycle system 12 and flows back to the suction inlet 11 of the second compressor 10. The high pressure separator vessel 36 operates at a pressure equal to or slightly higher than the 300 bar (30 MPa) pressure at the suction inlet 11 of the second compressor 10, so there is no need to compress the off gas from that vessel before it reaches the second compressor 10.

The concentrated liquid polymer/monomer mixture collects in the lower dish-shaped portion of the first separation vessel 36 and flows through an outlet therein and passes through a valved conduit into the upper part of the low pressure separation vessel 38. The low pressure separation vessel 38 is similar in shape to the high pressure separation vessel 36 and operates at a pressure in the region of from 0.5 to 1.0 bar (50 to 100 kPa). Molten polymer leaves the low pressure separation vessel 38 via an outlet in the bottom of that vessel and passes through a short conduit into the intake of a hot melt extruder 40. Extruder 40 is connected to a source 42 of masterbatch additives which may be used to modify the properties of the extruded polymer. Extruder 40 extrudes the polymer into strings which are chopped, cooled, and then dried via dryer 44, and transferred to blenders 46.

Almost all of the remaining monomer is separated off as off gas which leaves the low pressure separation vessel 38 via an outlet set in the upper portion of the vessel. Most of the off gas from the low pressure separation vessel 38 passes via a conduit equipped with heat exchangers (not shown in FIG. 1) to a purge gas compressor 48, and from there to the first compressor 5 (not shown in FIG. 1). The purge compressor 48 serves to increase the pressure of the off gas to the inlet pressure of the first compressor, 70 bar (7 MPa). The rest of the off gas from the low pressure separation vessel 38 is directed from the purge gas compressor 48 to off-site storage sites 49a and 49b.

The quench system 50 of the invention comprises the jet pump 7, the conduit configuration routing all of the low pressure flow of ethylene discharged from the first compressor 5 to jet pump 7, and the control system 70 of the first and second compressors 5, 10.

Figure 2:
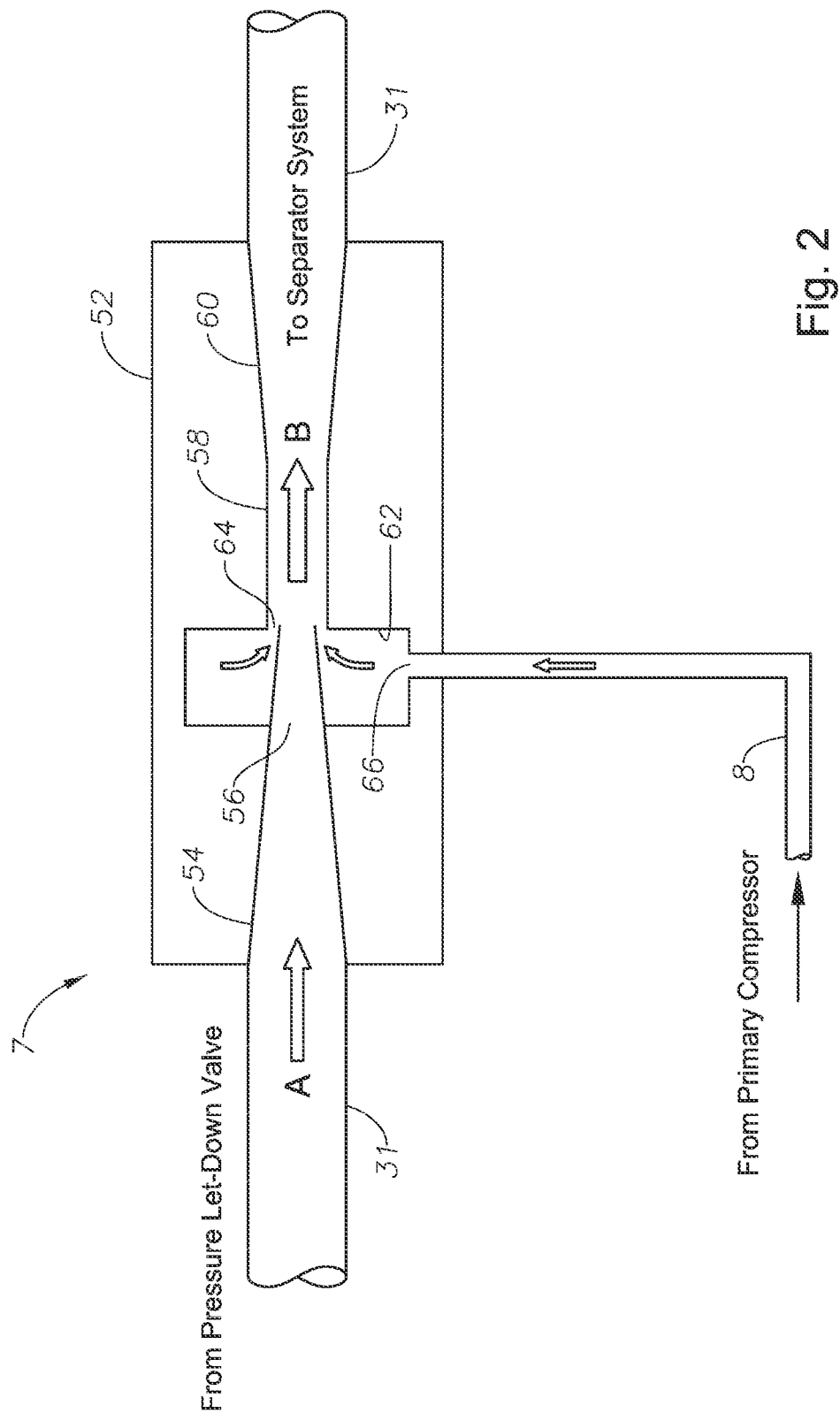
FIG. 2 is a schematic diagram of the jet pump used in the quench system of the invention.

The jet pump 7 is shown in greater detail in FIG. 2. The product mixture flows through the high pressure let down valve 32 (not shown in FIG. 2) along conduit 31 in the direction of arrow A into the jet pump 7. The jet pump 7 is constructed of high strength steel and comprises a generally cylindrical outer body 52 into one end of which the conduit 31 enters. Once inside the body 52 the conduit 31 tapers into a tapered portion that forms nozzle 56, which is also known as an eductor jet. The flow velocity of the product mixture increases in the tapered portion of conduit 54 and it leaves the nozzle 56 at a high velocity jet (see arrow B) which projects into a tubular portion 58 which is coaxial with the nozzle 56 but of slightly larger diameter. After a short distance, the tubular portion 58 begins to taper outwards in a tapered portion 60 (referred to as a "diffuser") until it is at a diameter similar to that of conduit 31. The product mixture then leaves the jet pump 7 and flows via conduit 31 to the high pressure separation vessel 36 (not shown in FIG. 2).

As can be seen from FIG. 2, surrounding the nozzle 56 is a short annular chamber 62, which is coaxial with nozzle 56 and opens into tubular portion 58. Nozzle 56 extends through that chamber 62 and terminates just at the entrance of tubular portion 58, thereby defining a narrow annular gap 64 between the rim of the nozzle 56 and the tubular portion 58. Low pressure ethylene from the first compressor 5 (not shown in FIG. 2) flows along conduit 8 in the direction of the arrow and through an inlet 66 into the chamber 62. The jet of product mixture emerging from nozzle or eductor jet 56 is at a velocity sufficient to draw low pressure ethylene via the Venturi effect from the first compressor 5 through the conduit 8 and into the annular chamber 62, where it is discharged through the annular gap 64 to mix with, cool and dilute the product mixture. The jet pump 7 has no moving parts and is therefore low maintenance. Moreover, the jet pump 7 is driven from energy derived from the flow of product stream and so the cool ethylene from the first compressor 5 is pumped into the product stream without using any energy from an external source.

The quench system may further include a control system that controls the suction pressure of the second compressor at a desired set point by modulating the monomer under relatively low pressure from the first compressor to the jet pump. Such a control system may include digital controllers operatively connected to both the first and second compressors, and to each other. The control system may further include temperature and pressure sensors that continuously relay the suction temperature and pressure of the second compressor to the digital controller of the second compressor. When the quench system is operated in the preferred mode with all of the low pressure monomer discharged by the first compressor being directed into the jet pump, the digital controller for the second compressor maintains a substantially constant suction pressure by signaling the first compressor's digital controller to adjust the spillback valve of the first compressor to control the amount of monomer flow to the jet pump. This provides a simple, robust, and reliable way to control the first and second compressors during the operation of the system.

Figure 3:
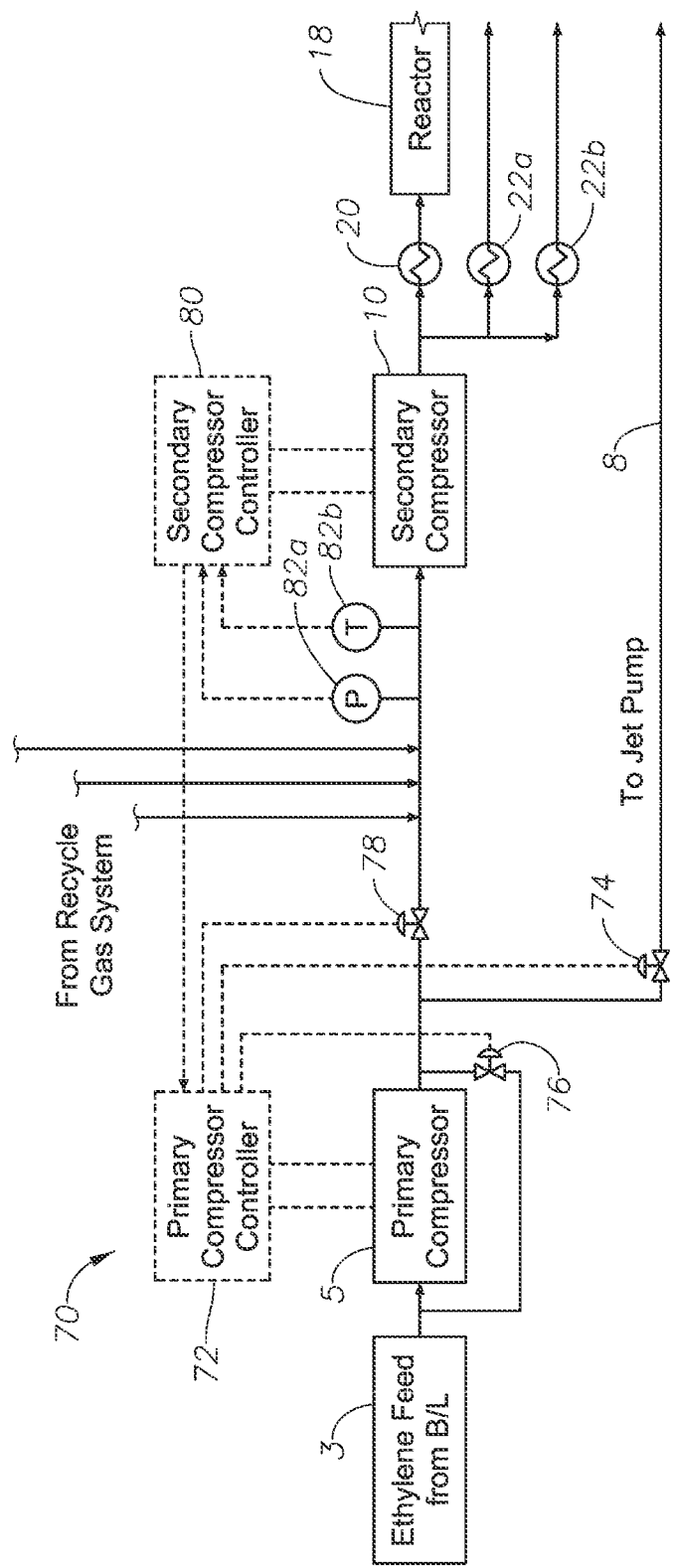
FIG. 3 is an enlargement of the portion of FIG. 1 illustrating the first and second compressors and their associated control system.

A first and second compressor control system 70 is shown in greater detail in FIG. 3. Control system 70 includes a first compressor controller 72, which may be implemented by any one of a number of commercially available digital controllers such as a Honeywell Experion® Knowledge Control System. Controller 72 is connected to electrically controlled valves 74, 76 and 78. Valve 74 controls the flow of make-up ethylene from the outlet of the first compressor 5 to the jet pump 7, while valve 76 is the spillback valve of the first compressor 5 and hence controls the net flow of ethylene out of the first compressor. Valve 78 is an inlet valve which, under temporary start up conditions, may be used to direct make-up ethylene from the first compressor 5 to the suction inlet 11 (not shown in FIG. 3) of the second compressor 10. The first compressor controller 72 can also maintain the rod loading on the piston rods of the compressor 5 at a desired set point. Control system 70 further includes a second compressor controller 80, (which also may be implemented by any one of a number of commercially available digital controllers) as well as suction inlet temperature and pressure sensors 82a and 82b which continuously relay the temperature and pressure conditions of the suction inlet 11 to the controller 80. As indicated by the dotted lines, the second compressor controller 80 can also maintain the rod loading on the piston rods of the compressor 10 at a desired set point. As is further indicated by the dotted control line, the second compressor controller 80 effectively controls the first compressor controller 72, as described in more detail hereinafter.

In the preferred mode of operation, which is also reflective of the method of the invention, first compressor controller 72 opens jet pump valve 74 and completely closes inlet valve 78 such that all of the approximately 300 bar (30 MPa) make-up ethylene discharged by the first compressor 5 is conducted to the jet pump 7 to provide a cold quench to the product stream entering the separator system 34 (not shown in FIG. 3). Such operation advantageously allows the first compressor 5 to operate such that its outlet pressure is not dependent upon the suction pressure of the second compressor 10. Accordingly, first compressor 5 is preferably operated such that its outlet pressure is less than the suction pressure of the second compressor, thereby conserving the amount of energy required to operate the first compressor 5. Such a reduced load on the first compressor 5 (as compared to prior art configurations where the discharge pressure of the first compressor must be higher than the suction pressure of the second compressor) lowers the long term maintenance costs of the compressor and enhances its reliability. Additionally, such a flow configuration allows for a simple, robust and reliable mode of operation, as will be described in detail hereinafter.

When all of the make-up ethylene discharged by the first compressor 5 is directed to the jet pump 7, the suction pressure of the second compressor 10 is maintained at a desired level by the controller 80. Controller 80 continuously monitors the signals received from the suction inlet temperature and pressure sensors 82a and 82b and maintains the rod loading of the second compressor 10 at a level commensurate with the desired suction pressure by relaying signals to the first compressor controller 72 to modulate the spillback valve 76 such that the net output of the first compressor 5 (which affects the amount of recycled ethylene introduced into the suction inlet 11 of the second compressor 10) maintains the suction pressure at a desired level. During steady-state production conditions, the amount of make-up ethylene pumped by the first compressor 5 will remain substantially constant over time at a level which compensates for the amount of ethylene converted to polymer. More specifically, the first compressor discharge pressure will "float" to a value where the jet pump suction flow of make-up ethylene that is ultimately recycled to the suction inlet of the second compressor compensates for the amount of ethylene converted to polymer. While the operation of the first and second compressor control system 70 has been described in terms of the controller 80 modulating the spillback valve 76 of the first compressor 5, it should be noted that there are a number of alternative ways the controller 80 can obtain the same result. For example, the controller 80 could modulate the discharge of make-up ethylene from the first compressor 5 by controlling the compressor speed, or the compressor discharge pressure. All such alternative modes of operation are encompassed within the invention.

During start-up, the quench system 50 (not shown in FIG. 3) is temporarily operated in a different mode where some of the make-up ethylene discharged by the first compressor is conducted directly into the suction inlet 11 of the second compressor 10. Such a different mode of operation is adopted at start up due to the fact that the routing of all of the make-up ethylene to the product stream leaving the pressure let down valve 32 (not shown in FIG. 3) at start up would over-cool the product stream and interfere with production. Under such circumstances, first compressor controller 70 partially opens the inlet valve 78 and partially closes the suction valve 74. Such a mode of operation requires the first compressor 5 to be operated such that its discharge pressure slightly exceeds the suction pressure of the second compressor 10, but even so some amount of energy savings is realized as the presence of the jet pump 7 relieves some of the load that would ordinarily be borne by the first compressor 5. After start up, when production enters steady state, valve 78 is closed and suction valve 74 is completely opened to allow all of the make-up ethylene form the first compressor to be routed to the jet pump 7. In the context of this application, the discharge pressure of the first compressor 5 is considered as being "substantially equal to" the suction pressure of the second compressor 10, when the discharge pressure of the first compressor 5 slightly exceeds the suction pressure of the second compressor 10.

Although preferred embodiments have been depicted and described in detail herein, it will be apparent to those skilled in the relevant art that various modifications, additions, substitutions, and the like can be made without departing from the spirit of the invention and these are, therefore, considered to be within the scope of the invention as defined in the claims which follow. While the invention has been described in the context of a polyethylene system using a high pressure tubular reactor, the invention is applicable to systems utilizing any type of high pressure reactor, such as an autoclave type reactor. Accordingly, to the extent that the description is specific, this is solely for the purpose of illustrating a preferred embodiment of our invention and should not be taken as limiting the invention to this specific embodiment. The use of subheadings in the description is intended to assist and is not intended to limit the scope of our invention in any way.

The invention claimed is:

1. An ethylene polymerization system comprising:
a first compressor that provides a monomer under relatively low pressure;
a second compressor located downstream of and in fluid communication with the first compressor, wherein the second compressor pressurizes the monomer to a relatively high pressure;
a reactor located downstream of and in fluid communication with the second compressor, wherein the reactor polymerizes the monomer under relatively high pressure to produce a product mixture;
a separation system downstream of and in fluid communication with the reactor; and
a quench system that cools the product mixture entering the separation system, the quench system including a pump located downstream of and in fluid communication with the reactor, the pump having a suction inlet that receives at least a portion of the monomer under relatively low pressure from the first compressor such that the pressure of the monomer under relatively low pressure from the first compressor is less than a suction pressure of the second compressor.

2. An ethylene polymerization system comprising:
a first compressor that provides monomer under relatively low pressure;
a second compressor located downstream of and in fluid communication with the first compressor, wherein the second compressor pressurizes the monomer to a relatively high pressure;
a high pressure reactor downstream of and in fluid communication with the second compressor, wherein the high pressure polymerization reactor polymerizes the monomer to produce a product mixture including polymer and unreacted monomer;
a high pressure let down valve located downstream of and in fluid communication with the high pressure reactor through which the product mixture from the high pressure reactor flows;
a separation system downstream of the high pressure let down valve that separates gas from the product mixture and produces a stream of off gas that is recycled into a feed that flows into a suction port of the second compressor; and
a quench system that cools the product mixture entering the separation system, the quench system including a jet pump located downstream of the high pressure let down valve having a suction inlet that receives all or substantially all of the monomer under relatively low pressure from the first compressor such that the pressure of the flow of monomer from the first compressor is less than or about equal to a suction pressure of the second compressor.

3. The polymerization system of claim 2, wherein the high pressure reactor is one of a tubular reactor and an autoclave reactor.

4. The polymerization system of claim 2, wherein the suction inlet receives all of the monomer under relatively low pressure from the first compressor.

5. The polymerization system of claim 2, wherein the high pressure reactor operates at an internal pressure of 1000 bar (100 MPa) or more.

6. The polymerization system of claim 2, wherein the first compressor includes a spillback valve, and wherein the quench system further includes a control system that controls the suction pressure of the second compressor at a desired set point by modulating the spillback valve which in turn modulates the monomer under relatively low pressure from the first compressor to the jet pump.

7. The polymerization system of claim 6, wherein the control system maintains a selected suction pressure of the second compressor by maintaining a selected rod loading of the second compressor.

8. The polymerization system of claim 6, wherein the control system includes a digital controller operatively connected to the second compressor, and a temperature sensor and a pressure sensor operatively connected to the digital controller that continuously monitors the suction temperature and suction pressure of the second compressor.

9. The polymerization system of claim 6, wherein the control system further includes a digital controller operatively connected to the first compressor and the spillback valve, and wherein the digital controller of the second compressor further maintains a substantially constant suction pressure by signaling the digital controller of the first compressor to adjust the spillback valve to control the amount of monomer flow to the jet pump.

10. The polymerization system of claim 6, wherein the control system further includes rod loading sensors in both the first and second compressors that are operatively connected to and adjusted by the first and second compressor's digital controllers, respectively, to maintain a constant second compressor suction pressure.

11. An ethylene polymerization system comprising:
a first compressor including a spillback valve that provides monomer under relatively low pressure;
a second compressor located down stream of and in fluid communication with the first compressor, wherein the second compressor pressurizes the monomer to a relatively high pressure;
a high pressure reactor located downstream of and in fluid communication with the second compressor that polymerizes the monomer to produce a product mixture comprising polymer and unreacted monomer;
a high pressure let down valve downstream of and in fluid communication with the high pressure reactor through which the product mixture from the high pressure reactor flows;
a separation system downstream of and in fluid communication with the high pressure let down valve that separates gas from the product mixture and produces a stream of off gas that is recycled into a feed that flows into a suction port of the second compressor; and
a quench system that cools the product mixture entering the separation system, the quench system including a jet pump downstream of the high pressure let down valve having a suction inlet that receives all or substantially all of the low pressure flow of monomer from the first compressor such that the pressure of the flow of monomer from the first compressor is less than or about equal to a suction pressure of the second compressor, and a control system that controls the suction pressure of the second compressor at a desired set point by modulating the spillback valve of the first compressor which in turn modulates the monomer under relatively low pressure from the first compressor to the jet pump.

12. The polymerization system of claim 11, wherein the control system includes a digital controller operatively connected to the second compressor, and a temperature sensor and a pressure sensor operatively connected to the digital controller that continuously monitors the suction temperature and suction pressure of the second compressor.

13. The polymerization system of claim 11, wherein the control system further includes a digital controller operatively connected to the first compressor and the spillback valve, and wherein the second compressor digital controller further maintains a substantially constant suction pressure by signaling the first compressor digital controller to adjust the spillback valve to control the amount of monomer flow to the jet pump.

14. The polymerization system of claim 11, wherein the control system further includes rod loading sensors in both the first and second compressors that are operatively connected to and adjusted by the first and second compressor digital controllers, respectively, to maintain a constant second compressor suction pressure.

15. The polymerization system of claim 11, further including a recycle gas system downstream of the stream of off gas that transforms the off gas into feed monomer.

16. A method of providing a quenching to a product stream generated by an ethylene polymerization system that includes a first compressor that provides monomer under relatively low pressure; a second compressor located down stream of and in fluid communication with the first compressor that pressurizes to a relatively low pressure to a monomer under relatively high pressure; a high pressure reactor downstream of and in fluid communication with the second compressor that polymerizes the monomer to a product mixture; a high pressure let down valve located downstream of and in fluid communication with the reactor through which the product mixture from the high pressure reactor flows, and a separation system downstream of the high pressure let down valve that receives the flow of product mixture, comprising:
providing a pump between the high pressure let down valve and the separation system;
directing the product mixture flow through the pump; and
directing substantially all of the monomer under relatively low pressure from the first compressor to a suction inlet of the pump.

17. The method of claim 16, wherein the pump is a jet pump.

18. The method of claim 16, further including the step of operating the first compressor such that a discharge pressure of the first compressor is less than a suction pressure of the second compressor.

19. The method of claim 16, further including the step of monitoring a suction pressure of the second compressor and modulating the monomer under relatively low pressure from the first compressor on the basis of the suction pressure.

20. The method of claim 16, wherein the monomer under relatively low pressure from the first compressor is modulated by one of modulating at least one spillback valve of the first compressor, modulating a speed of the first compressor, and modulating a discharge pressure of the first compressor.

* * * * *